United States Patent
Loh et al.

(10) Patent No.: US 8,210,811 B2
(45) Date of Patent: Jul. 3, 2012

(54) APPARATUS AND METHOD FOR OPERATION OF A WIND TURBINE

(75) Inventors: Friedrich Loh, Schuettorf (DE); Detlef Menke, Lotte (DE); Christoph Schulten, Salzbergen (DE); Gert Torbohm, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/856,767

(22) Filed: Aug. 16, 2010

(65) Prior Publication Data

US 2011/0142620 A1 Jun. 16, 2011

(51) Int. Cl.
*F03D 7/04* (2006.01)

(52) U.S. Cl. .............................. 416/1; 416/44

(58) Field of Classification Search .................. 290/44, 290/55; 415/1, 15, 16, 17, 30, 33; 416/1, 416/44, 46, 49

See application file for complete search history.

(56) References Cited

U.S. PATENT DOCUMENTS

| | | | |
|---|---|---|---|
| 6,420,795 B1 * | 7/2002 | Mikhail et al. | 290/44 |
| 6,600,240 B2 * | 7/2003 | Mikhail et al. | 307/85 |
| 6,847,128 B2 * | 1/2005 | Mikhail et al. | 290/44 |
| 6,856,039 B2 * | 2/2005 | Mikhail et al. | 290/44 |
| 7,095,131 B2 * | 8/2006 | Mikhail et al. | 290/44 |
| 7,121,795 B2 * | 10/2006 | Moroz et al. | 416/1 |
| 7,271,571 B2 * | 9/2007 | Ye et al. | 322/36 |
| 7,398,648 B2 * | 7/2008 | Tatsuno et al. | 60/448 |
| 7,445,420 B2 * | 11/2008 | Yoshida | 415/4.3 |
| 2006/0140761 A1 * | 6/2006 | LeMieux | 416/61 |
| 2009/0047130 A1 * | 2/2009 | Egedal | 416/61 |
| 2010/0060001 A1 * | 3/2010 | Gabrys | 290/44 |
| 2010/0135800 A1 * | 6/2010 | Melius | 416/44 |
| 2010/0135801 A1 * | 6/2010 | Melius | 416/44 |

FOREIGN PATENT DOCUMENTS

GB 2448940 A * 11/2008

* cited by examiner

*Primary Examiner* — Edward Look
*Assistant Examiner* — Sean J Younger
(74) *Attorney, Agent, or Firm* — Global Patent Operation; Douglas D. Zhang (57) ABSTRACT

A method for operating a wind turbine is provided. The wind turbine includes a rotor including at least one rotor blade and a pitch drive system coupled to the at least one rotor blade. The pitch drive system is adapted for pitching the rotor blade. The method includes: determining an actual value of a first variable indicative of an overspeed state of the wind turbine; determining an actual value of a second variable of the wind turbine correlated to the rate of change over time of the first variable; and, estimating an occurrence of an overspeed state of the wind turbine from at least the determined actual values of the first and second variables. The pitch drive system pitches the rotor blade for aerodynamically braking the rotor based on the result of the estimation.

22 Claims, 6 Drawing Sheets

APPARATUS AND METHOD FOR OPERATION OF A WIND TURBINE

BACKGROUND OF THE INVENTION

The subject matter described herein relates generally to methods and systems for operating a wind turbine, and more particularly, to methods and systems for operating a control assembly for a wind turbine.

At least some known wind turbines include a tower and a nacelle mounted on the tower. A rotor is rotatably mounted to the nacelle and is coupled to an electric generator by a rotor shaft. In typical wind turbines, a plurality of blades extend from the rotor. The blades are oriented in a manner such that wind passing over the blades turns the rotor and rotates the rotor shaft, thereby driving the generator to generate electricity.

At least some known wind turbines are operated by a control system. Furthermore, at least some known control systems for wind turbines implement pitch control thereof by rotation of the rotor blades about a pitch axis. That is, these control systems are designed for regulating the rotor speed of the wind turbine by setting the angles of the blades, i.e., pitching the blades, with respect to the airflow. Pitching the blades for decreasing the rotor speed generally results in an increase of the load acting on some of the components of the wind turbine, such as the blades, the rotor, or the wind tower.

Generally, an increase of the speed of the wind impinging on the rotor blades causes an increase of the rotor speed. Under certain conditions, such as high winds in the area of the wind turbine, the rotor speed may eventually exceed a threshold value corresponding to the maximum allowable speed of the wind turbine (i.e., an overspeed).

At least some known control systems which implement pitch control are designed for monitoring the rotor speed by determining actual values thereof and aerodynamically decreasing the rotor speed (i.e., braking the rotor) by increasing the pitch angle of the blades as soon as an actual value of the rotor speed exceeds the maximum allowable speed of the wind turbine. In this situation, decreasing the rotor speed by pitching the blades may result in a particularly significant increase of the load acting on components of the wind turbine. Generally, such a significant load increase negatively influences the operating life of the turbine. In at least some known pitch control systems, the pitch control drives the rotor speed back under the maximum allowable speed of the wind turbine. At least some of these pitch control systems are designed to decrease the pitch angle as soon as the rotor speed is under the maximum allowable speed of the wind turbine for maintaining a high rotor speed but within the security margin of the wind turbine (i.e., below the maximum allowable speed of the wind turbine).

In such overspeed events regulated by known control systems, the increase and posterior decrease of the pitch angle generally result in alternating forces acting on the tower. In some cases, these alternating forces may excite the resonant modes of the tower and lead to a resonant vibration of the tower. Such a resonant vibration of the tower may require shutting down the wind turbine when the vibration exceeds a maximum allowable limit. A shutdown event generally implies a loss of the capacity for generating power by the wind turbine.

Accordingly, it is desirable to provide a method and/or apparatus capable of implementing a pitch control which avoids high load on the wind turbine components and/or diminishes the risk of a shutdown of the wind turbine due to an overspeed state of the wind turbine.

BRIEF DESCRIPTION OF THE INVENTION

The embodiments described herein include a control assembly which estimates the occurrence of an overspeed state of the wind from actual values of multiple variables of the wind turbine and pitches at least one of the rotor blades based on the result of the estimation. By estimating the occurrence of an overspeed state, the embodiments described herein enable a smooth pitching of a rotor blade. Thereby, the pitching typically causes a smooth braking of the rotor. Consequently, transient loads acting on the wind turbine components are typically reduced, and the operating life of the wind turbine is typically extended. Furthermore, such a smooth pitching typically diminishes the risk of a resonant vibration of the wind turbine and a shutdown of the wind turbine. In particular, according to at least one embodiment, a rotor blade is pitched in a manner such that a first variable of the wind turbine, such as the rotor speed, does not exceed a threshold value indicating an overspeed state of the wind turbine.

In one aspect, a method for operating a wind turbine is provided. The wind turbine includes a rotor including at least one rotor blade and a pitch drive system coupled to the at least one rotor blade. The pitch drive system is adapted for pitching the at least one rotor blade. The method includes: determining an actual value of a first variable indicative of an overspeed state of the wind turbine; determining an actual value of a second variable of the wind turbine correlated to the rate of change over time of the first variable; and, estimating an occurrence of an overspeed state of the wind turbine from at least the determined actual values of the first and second variables. The pitch drive system pitches the at least one rotor blade for aerodynamically braking the rotor based on the result of the estimation. In certain embodiments of the present disclosure, the first variable indicates an overspeed state of the wind turbine when it exceeds a threshold value.

In another aspect, a control assembly for use with a wind turbine is provided. The wind turbine includes a rotor including at least one rotor blade. The control assembly includes a pitch drive system coupled to the at least one rotor blade, the pitch drive system being adapted for pitching the at least one rotor blade. The wind turbine further includes a control system being communicatively coupled to the pitch drive system. The control system is configured to: determine an actual value of a first variable indicative of an overspeed state of the wind turbine; determine an actual value of a second variable of the wind turbine correlated to the rate of change over time of the first variable; and, estimate an occurrence of an overspeed state of the wind turbine from at least the determined actual values of the first and second variables. The control system is configured to control the pitch drive system in a manner such that the control pitch drive system pitches the at least one rotor blade for aerodynamically braking the rotor based on the result of the estimation.

In yet another aspect, a method for operating a wind turbine is provided. The wind turbine includes a rotor including at least one rotor blade, and a pitch drive system coupled to the at least one rotor blade, the pitch drive system being adapted for pitching the at least one rotor blade. The method includes: determining an actual value of a reference speed directly proportional to the rotational speed of the rotor; determining an actual value of a rate of change over time of the reference speed; and, evaluating the determined actual values of the reference speed and the rate of change over time of the reference speed for identifying an overspeed state of the wind turbine. The pitch drive system rotates the at least one rotor blade when an overspeed state of the wind turbine is identified in the evaluation.

Further aspects, advantages, and features of the present invention are apparent from the dependent claims, the description, and the accompanying drawings.

BRIEF DESCRIPTION OF THE DRAWINGS

A full and enabling disclosure, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

According to embodiments described herein, a wind turbine operates a pitch drive system for rotating a rotor blade based on the result of estimating an occurrence of an overspeed state of the wind turbine. The estimation is based on determined actual values of multiple values of the wind turbine. At least one of these variables, referred to as the first variable, is indicative of an overspeed state of the wind turbine. For example, the first variable may be the rotor speed, which indicates an overspeed of the wind turbine when it exceeds the maximum allowable speed of the wind turbine (i.e., an overspeed). Alternatively, the first variable may be a power output of the wind turbine, the bending of one or more rotor blades, the wind speed in the surroundings of the wind turbine, or any other variable which indicates an overspeed state of the wind turbine when it exceeds a threshold value. Typically, the first variable of the wind turbine is a variable which is monotonically correlated with the rotor speed. At least another of these variables, referred to as the second variable, is correlated to the rate of change over time of the first variable. In the example above, the second variable may be the rotor acceleration. Typically, the second variable is monotonically correlated with the rotor rotational acceleration. According to at least some embodiments, the estimation may be based on further variables of the wind turbine. In the example above, the second time derivative, the third time derivative, or ever further time derivatives of the first variable (e.g., the rotor speed) may be used for the estimation.

According to certain embodiments, the pitch drive system rotates the rotor blade for aerodynamically braking the rotor when the result of the estimation is the occurrence of an overspeed state within a predetermined time. For example, the estimation may consist of calculating the value of the rotor speed within a predetermined period of time (i.e., a future rotor speed) based on determined actual values of the first and the second variables, and comparing the identified future rotor speed with a predetermined rotor speed value, which typically corresponds to the maximum allowable speed of the wind turbine. In this example, if the identified future rotor speed exceeds the predetermined rotor speed, the result of the estimation is the occurrence of an overspeed state within that period of time and, consequently, the pitch drive system pitches the rotor blade or blades for aerodynamically braking the rotor.

The embodiments described herein provide a wind turbine that enables a pitch assembly to smoothly rotate a rotor blade about a pitch axis (i.e., to smoothly pitch a rotor blade). In particular, the embodiments described herein facilitate performing pitching before the wind turbine is in an overspeed state. Furthermore, according to certain embodiments, pitching is performed in a manner such that an estimated overspeed state does not occur.

Therefore, the embodiments described herein typically facilitate reducing the aerodynamic load in the components of the wind turbine, which typically extends the operating lifetime of the wind turbine. Furthermore, a wind turbine according to embodiments described herein typically facilitates avoiding shutdown caused by an overspeed state. Thereby, the embodiments described herein typically facilitate increasing the capacity for generating power by a wind turbine. As used herein, the term "overspeed state" refers to a state of the wind turbine where the rotor of the wind turbine rotates at a rotational speed at which potential damage to the rotor, including damage to the rotor blade or other component of the wind turbine, such as an electrical generator coupled to the rotor, may occur.

As used herein, the term variable of a wind turbine is intended to be representative of a magnitude related to the wind turbine varying over time. Some examples of variables of the wind turbine are rotor speed (i.e., rotation rate of the rotor), rotor acceleration, such as rotor rotational or axial acceleration, bending of the rotor blade or a power output of a wind turbine, such as a power output of an electric generator forming part of the wind turbine.

As used herein, the term actual value of a variable of a wind turbine is intended to be representative of a value of the variable actually adopted by the wind turbine. For example, an actual value of the rotor speed might be determined from a direct measurement of the rotor speed through a sensor. Alternatively, an actual value of the rotor speed might be determined from an estimation of a variable of a wind turbine based on a measured value of another variable, such as, but not limited to, a rotational speed of the rotor shaft or a rotational speed of a high speed shaft coupled to the rotor shaft through a gear system. For example, an actual value of the rotor acceleration may correspond to a direct measurement of the acceleration through a sensor coupled to the rotor. Alternatively, an actual value of the rotor acceleration may correspond to the rate of change over time of actual values of the rotor speed, which may be inferred from a time series of rotor speed values. Such variables of the wind turbine may be determined by any suitable method that enables operation of a wind turbine as described herein.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts the kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Within the following description of the drawings, the same reference numbers refer to the same components. Generally, only the differences with respect to the individual embodiments are described.

Figure 1:
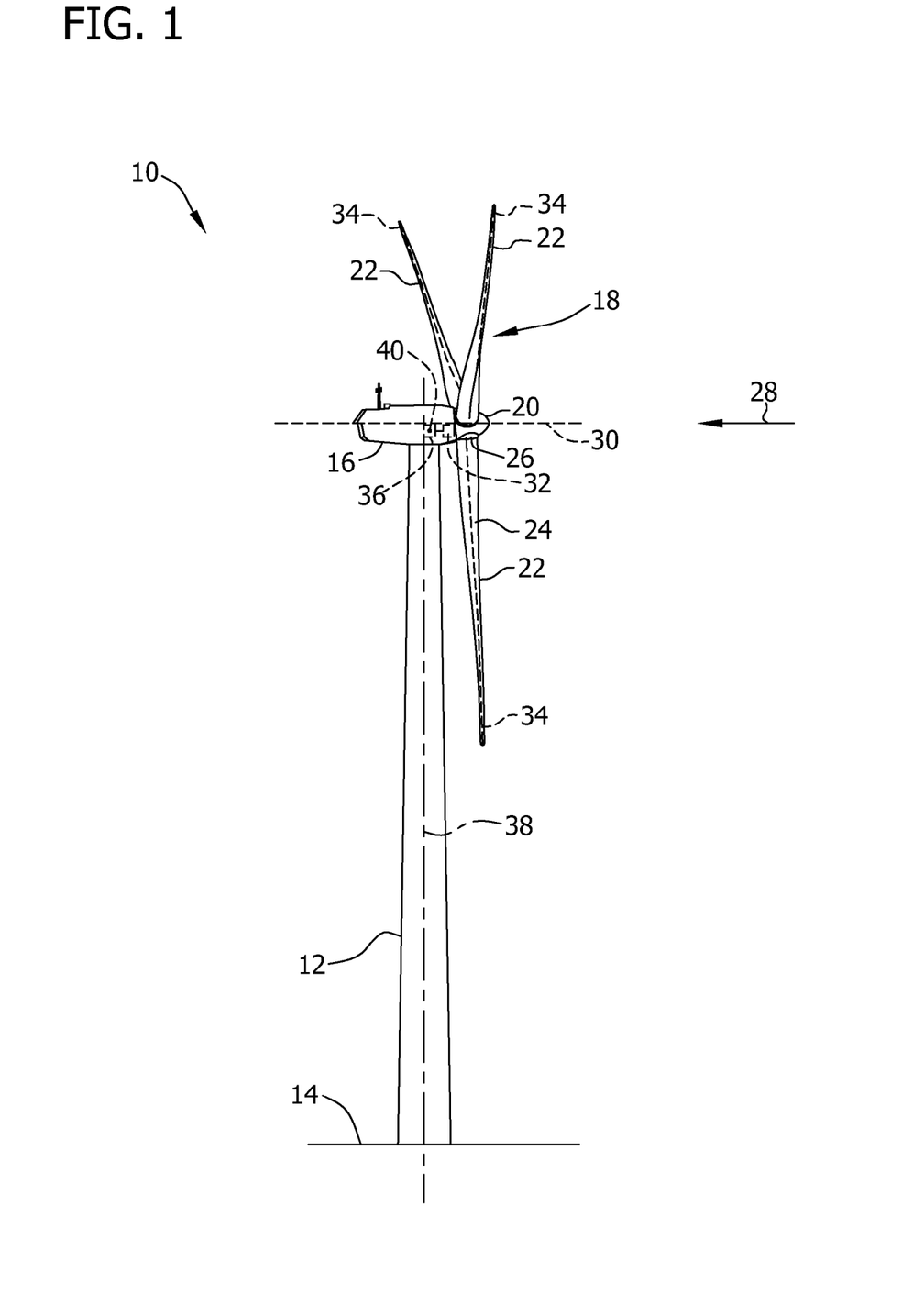
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In alternative embodiments, rotor 18 includes more or less than three rotor blades 22, such as one or four blades. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting a rotational position of at least one rotor blade 22 relative to wind vectors. In alternative embodiments, only the pitch angle of a portion of rotor blades 22 is changed by pitch adjustment system 32. Pitch axes 34 for rotor blades 22 are shown in FIG. 1. During operation of wind turbine 10, pitch adjustment system 32 may change a blade pitch of rotor blades 22, so that rotor blades 22 are moved to a feathered position in a manner such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16. Alternatively, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
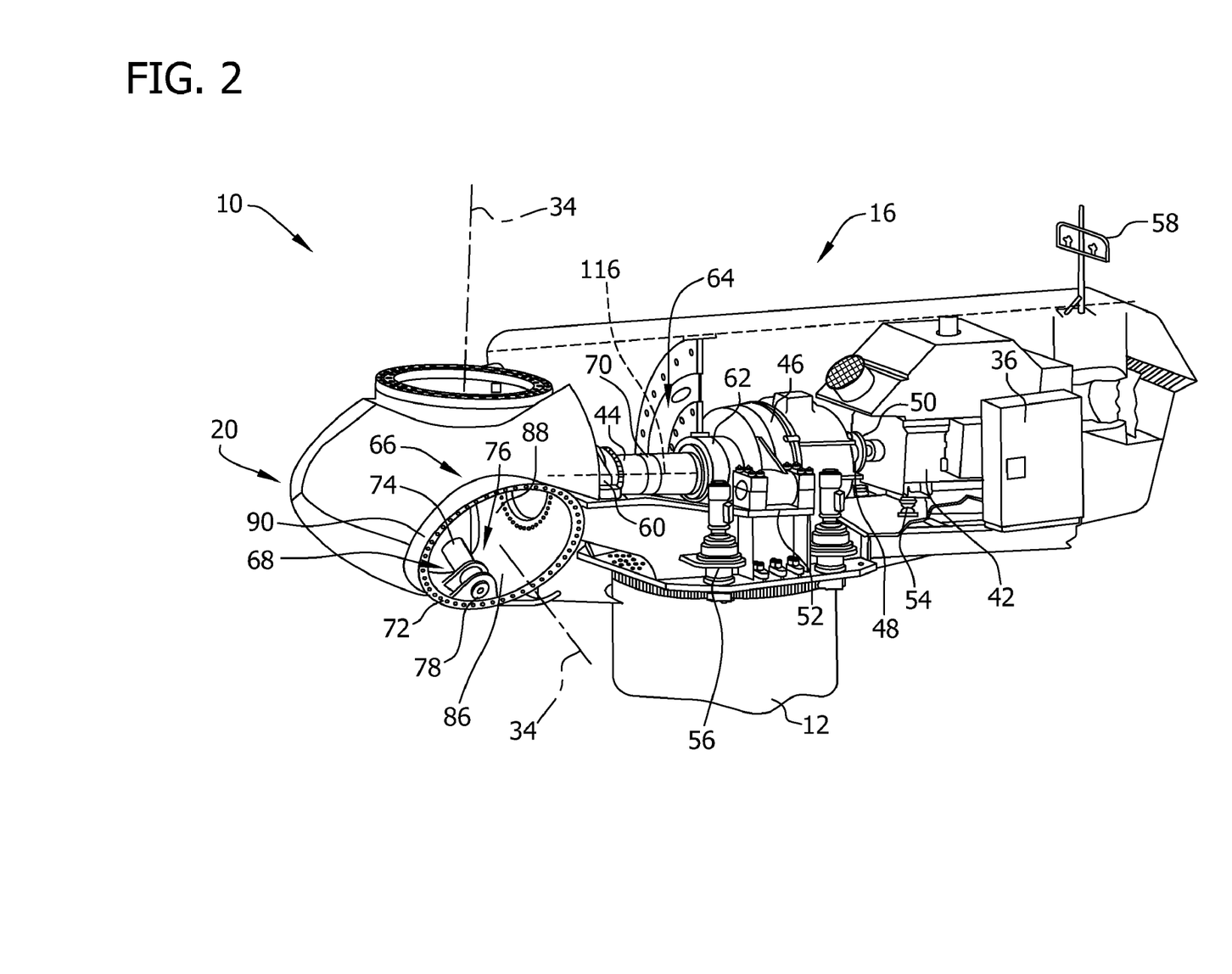
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

In the exemplary embodiment, nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, forward support bearing 60, aft support bearing 62, are sometimes referred to as a drive train 64.

In the exemplary embodiment, hub 20 includes a pitch assembly 66. Pitch assembly 66 includes one or more pitch drive systems 68. In the exemplary embodiment, nacelle 16 includes a sensor system which may include at least one sensor, such as speed sensor 70, for sensing at least one variable of wind turbine 10, such as a speed or acceleration of at least one rotor blade 22. Typically, as detailed below, the at least one sensor in the sensor system is communicatively coupled to control system 36. Typically, each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 in a manner such that pitch drive motor 74 imparts mechanical force to pitch drive gearbox 76. Pitch drive gearbox 76 is coupled to pitch drive pinion 78 in a manner such that pitch drive pinion 78 is rotated by pitch drive gearbox 76. Pitch bearing 72 is coupled to pitch drive pinion 78 in a manner such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

In the exemplary embodiment, pitch drive system 68 is coupled to control system 36 for adjusting the blade pitch of rotor blade 22 upon receipt of one or more signals from control system 36. Pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Figure 3:
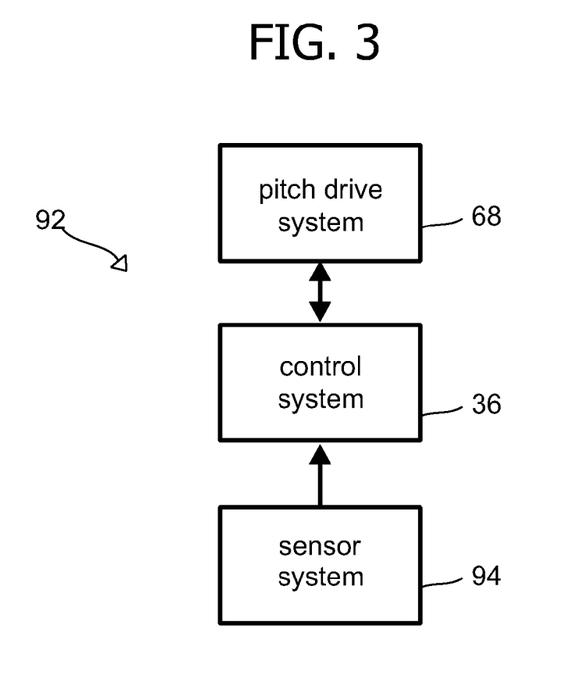
FIG. 3 is a block diagram of an exemplary control assembly of the wind turbine in FIG. 1.

FIG. 3 is a block diagram of an exemplary control assembly 92. In the exemplary embodiment, the control assembly 92 includes a pitch drive system 68, a control system 36, and a sensor system 94. Control assembly 92 may include any further suitable device that enables control assembly 92 to function as described herein. According to certain embodiments, pitch drive system 68 is coupled to at least one rotor blade 22 for rotating the rotor blade about a pitch axis 34. In the exemplary embodiment, pitch drive system 68 corresponds to a pitch drive system as described above. Pitch drive system 68 is communicatively coupled to control system 36, so that pitch drive system 68 is capable of adjusting the blade pitch of rotor blade 22 upon receipt of one or more signals from control system 36.

According to certain embodiments, control system 36 is communicatively coupled to pitch drive system 68 and is configured to estimate an occurrence of an overspeed state from at least the determined actual values of a first and second variable of wind turbine 10. In the exemplary embodiment, control system 36 determines the actual values through sensor system 94.

According to certain embodiments, the first variable is monotonically correlated with a rotational speed of rotor 18 and/or the second variable is monotonically correlated with a rotational acceleration of rotor 18. As used herein, the term monotonically correlated indicates a relationship between two variables of the wind turbine implying a correlated increase and decrease thereof. For example, as set forth above, wind turbine 10 may include a high speed shaft 48 coupled to rotor shaft 44 through a gearbox 46. In these embodiments, the rotational speed of high speed shaft 48 is typically directly proportional to the rotor speed. Therefore, as used herein, it is said that the rotational speed of high speed shaft 48 is monotonically correlated to the rotor speed. As a further example, in the exemplary embodiment, wind turbine 10 includes an electric generator 42 for generating an electric power output. The electric power output is typically proportional to the cube of the rotor speed. Therefore, as used herein, the power output is said to be monotonically correlated the rotor speed.

According to at least some embodiments, control system 36 determines actual values of the first variable through sensor system 94 and determines actual values of the second variable from the determined values of the first variable. For example, control system 36 may be configured to determine the actual value of the second variable by calculating the rate of change over time of the first variable. In particular, control system 36 may determine actual values of the rotor speed (i.e., in this case, the first variable) through sensor system 94 and may determine actual values of the rotor rotational acceleration (i.e., in this case, the second variable) by calculating the rate of change over time of values of the rotor speed.

According to certain embodiments, pitch drive system 68 is configured to rotate rotor blade 22 based on the result of the estimation performed by control system 36. For example, rotor blade 22 is rotated when control system 36 identifies that the wind turbine 10 will enter an overspeed state based on the determined actual values. In the exemplary embodiment, control system 36 communicates with pitch drive system 68 for signaling that an overspeed state will occur. When pitch drive system 68 receives an overspeed state occurrence signal, it rotates rotor blade 22 towards a feathered position for reducing the rotor speed (i.e., aerodynamically braking the rotor 18.)

According to certain embodiments, sensor system 94 includes one or more sensors for measuring actual values of one or more variables of wind turbine 10. In particular, sensor system 94 is communicatively coupled to control system 36, typically for providing control system 36 with measured values of the variables. Based on the received measured values, control system 36 typically determines actual values of one or more variables of wind turbine 10. According to at least some of the embodiments, sensor system 36 is configured to measure at least one of an actual value of a first variable and/or of a second variable of wind turbine 10, such as rotor speed and rotor acceleration.

According to certain embodiments, sensor system 94 is adapted for being coupled to a rotatable part of wind turbine 10, the rotatable part being connected to rotor 18, for establishing an actual value of a first variable or of a second variable of the wind turbine by measuring the rotational speed of the rotatable part. In the exemplary embodiment, sensor system 94 includes speed sensor 70 for sensing rotor speed. In particular, in the exemplary embodiment, speed sensor 70 is coupled to rotor shaft 44 for measuring the rotational speed thereof. According to certain embodiments, speed sensor 70 includes a proximity sensor configured to register rotation of rotor shaft 44, so that speed sensor 70 measures the rotational speed of rotor shaft 44. The rotational speed of rotor shaft 44 corresponds to the rotor speed. In alternative embodiments, sensor system 94 may include a sensor suitable for measuring another variable of wind turbine 10, such as a speed sensor coupled to high speed shaft 48 for measuring the rotational speed thereof. In alternative embodiments, sensor system 94 may include any arrangement of sensors suitable for measuring multiple variables of wind turbine 10, for example, a speed sensor coupled to high speed shaft 48 for measuring the rotational speed of high speed shaft 48, and an acceleration sensor coupled to rotor 18 for measuring rotor acceleration.

In general, sensor system 94 may include any suitable sensor which provides a measurement of a variable of wind turbine 10 suitable for facilitating estimation of the occurrence of an overspeed state. For example, sensor system 94 may include a sensor coupled to an electric generator part of wind turbine 10, such as an output of electrical generator 42, for establishing at least one of an actual value of the first variable or an actual value of the second variable by measuring a power output, and/or its rate of change over time, of the electric generator part.

According to at least some of the embodiments, sensor system 94 may be configured to measure an actual value of a wind speed in an area close to wind turbine 10. In the exemplary embodiment, mast 58 forms part of sensor system 94 and provides wind speed and direction data to control system 36. In these embodiments, it is typical that control system 36 is configured to identify an overspeed state further based on a determined actual value of the wind speed. Thereby, control system 36 may identify an overspeed state of the wind turbine by considering actual values of the wind speed for estimating an occurrence of an overspeed state of wind turbine 10.

According to certain embodiments, sensor system 94 is configured to measure an actual value of a bending of rotor blade 22. In these embodiments, sensor system 94 may include any suitable sensor which enables determining a bending of rotor blade 22, such as a strain gauge sensor or an optical strain sensor.

According to certain embodiments, sensor system 94 is configured to measure acceleration of rotor 18 in a direction perpendicular to a longitudinal axis of hub 20 (i.e., acceleration in relation to gravity). In such embodiments, sensor system 94 typically includes one or more acceleration sensors (not shown) mounted at or near one of the rotor blades 22 to facilitate sensing a first acceleration of rotor 18 in a first direction perpendicular to the longitudinal axis of hub 20 and a second acceleration vector of rotor 18 in a direction perpendicular to both the first direction and the longitudinal axis of hub 20. In such embodiments, the measured value or values of the acceleration, along with at least one actual value of a further variable of wind turbine 10, are used for estimating an occurrence of an overspeed state.

In the exemplary embodiment, control system 94 determines an actual value of a first variable of the wind turbine from a measured rotational speed. In certain embodiments, the actual value is determined directly from at least one measured value. In other embodiments, the actual values of the first variable are derived from at least one measured value of another variable. For example, in some embodiments, the first variable corresponds to the rotor speed and control system 36 determines the rotor speed by deriving it from measurements of the rotational speed of high speed shaft 48. In these embodiments, control system 36 typically takes into account the gear ratio for deriving the actual values of the rotor speed from the measured rotational speed of high speed shaft 48. In the exemplary embodiment, control system 36 determines an actual value of the second variable from the rate of change over time of measured values of the rotor speed. Alternatively, control system 36 determines an actual value of the second variable directly from measurements of the rotor acceleration provided by sensor system 94. As set forth above, control system 36 evaluates the determined actual values of the first variable and the second variable for estimating the occurrence of an overspeed state of wind turbine 10.

Figure 4:
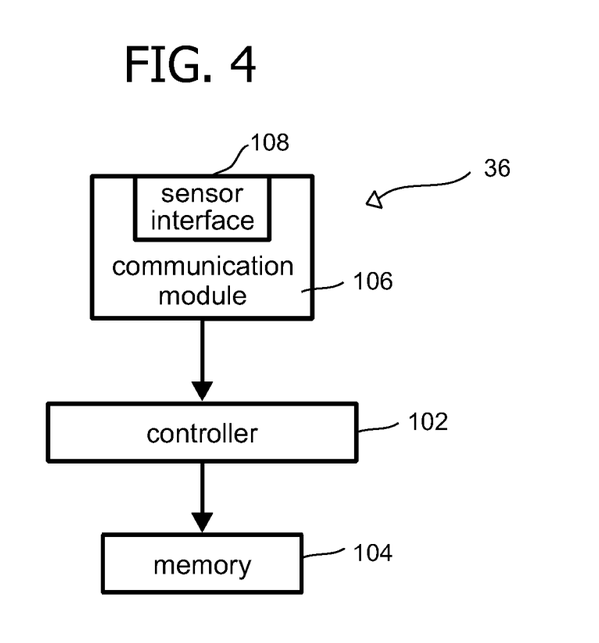
FIG. 4 is a block diagram of an exemplary control system of a control assembly of the wind turbine in FIG. 1.

FIG. 4 is a block diagram of an exemplary control system 36 forming part of a control assembly of wind turbine 10 of FIG. 1. In the exemplary embodiment, control system 36 includes a controller 102, a memory 104, and a communications module 106. Control system 36 may include any suitable device that enables control system 36 to function as described herein. In the exemplary embodiment, communications module 106 includes a sensor interface 108 that facilitates enabling controller 102 to communicate with sensor system 94. In one embodiment, sensor interface 108 includes an analog/digital converter that converts an analog voltage signal generated by the sensor to a multi-bit digital signal usable by controller 102. In alternative embodiments, communications module 106 may include any suitable wired and/or wireless communications device that facilitates transmitting signals to and/or receiving signals from any device located on the wind turbine, such as a device located at rotor shaft 44, or within or outside rotor 18 and/or remotely from rotor 18. In the exemplary embodiment, memory 104 may include any suitable storage device, including, but not limited to, flash memory, electronically erasable programmable memory, read only memory (ROM), removable media, and/or other volatile and non-volatile storage devices. In one embodiment, executable instructions (i.e., software instructions) are stored in memory 104 for use by controller 102 in controlling pitch drive system 68, as described below.

In the exemplary embodiment, controller 102 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 102 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome.

In the exemplary embodiment, a sensor of sensor system 94, such as a speed sensor 70, is coupled to rotor shaft 44 to facilitate measuring the rotational speed of rotor 18. Sensor system 94 may include a sensor mounted at any suitable location on wind turbine 10 that enables the sensor to measure a variable of wind turbine 10, such as a rotational speed of rotor 18, or a rotational speed that is directly proportional thereto, such as a rotational speed of high speed shaft 48.

According to certain embodiments, controller 102 is programmed to determine an actual value of a first variable indicative of an overspeed state of wind turbine 10. In the exemplary embodiment, a sensor of sensor system 94 is communicatively coupled to controller 102 across any suitable wired and/or wireless communication medium via sensor interface 108 of communications module 106 to facilitate enabling the sensor to transmit signals to and/or receive signals from controller 102. In the exemplary embodiment, speed sensor 70 continuously measures actual values of a rotational speed of rotor 18, and speed sensor 70 continuously transmits signals indicative of measured actual values of the rotor speed to controller 102 in real-time. In one embodiment, controller 102 may be programmed to continuously receive and monitor the signals transmitted by speed sensor 70. In an alternative embodiment, controller 102 may not continuously receive and/or monitor the signals transmitted by speed sensor 70 but, rather, may be programmed to iteratively request signals from speed sensor 70 at predetermined time intervals. In certain embodiments, controller 102 and/or speed sensor 70 may transmit signals to and/or receive signals from one another at any suitable time intervals. Alternative or additional sensors of sensor system 94 communicate in an analogous manner with controller 102 for transmitting thereto measured actual values of variables of wind turbine 10.

According to certain embodiments, controller 102 is programmed to determine an actual value of a second variable of wind turbine 10 correlated to the rate of change over time of a first variable. Typically, the second variable correlates to the rate of change over time of the first variable in a manner such that a variation of the time rate is accompanied by a variation of the second variable, and usually parallel to it. In the exemplary embodiment, controller 102 is programmed to determine a rate of change over time of the rotational speed of rotor 18 from measured actual values of the rotor speed. In this manner, the exemplary controller 102 determines actual values of a second variable of wind turbine 10, in this case, the rotational acceleration of rotor 18, from the rate of change over time of the first variable (i.e., in this case, the rotational speed of rotor 18). In other alternative embodiments, controller 102 may determine actual values of a second variable of the wind turbine from data measured by sensors forming part of sensor system 94. For example, controller 102 may determine the actual values of the rotational acceleration from data measured by an acceleration sensor forming part of sensor system 18. In other alternative embodiments, controller 102 may determine actual values of the second variable of the wind turbine, such as the rotor acceleration, from the rate of change over time of other variables of the wind turbine, such as, but not limited to, the rotational speed of high speed shaft 48 or a power output of wind turbine 10.

During operation of the exemplary wind turbine 10, controller 102 is programmed to receive signals corresponding to actual values of at least one variable of the wind turbine, such as measured data provided by speed sensor 70, and controller 102 is programmed to associate a value of a variable of the wind turbine with each signal for determining at least one actual value of that variable. For example, controller 102 may be programmed to associate a value of the rotational speed of rotor 18 with a signal from speed sensor 70 for determining an actual value of the rotational speed of rotor 18. According to some embodiments, controller 102 is programmed to associate a value of a second variable of the wind turbine to a signal from a sensor of sensor system 94. For example, controller 102 may be programmed to associate a value of the rotational acceleration of rotor 18 with a signal of an acceleration sensor for determining an actual value of the acceleration of rotor 18.

In the exemplary embodiment, controller 102 is programmed to store data representative of an overspeed state (i.e., an overspeed condition of rotor 18) in memory 104. For example, controller 102 may store the maximum allowable speed of the wind turbine. At that speed, it is said that rotor 18 is at an overspeed condition. In another embodiment, controller 102 stores a lookup table correlating values of a first and a second variable of wind turbine 10 with the occurrence of an overspeed. For example, such a lookup table may correlate values of rotor speed and rotor acceleration which cause an overspeed condition of wind turbine 10 to occur within a predetermined period of time.

According to certain embodiments, controller 102 is programmed to estimate an occurrence of an overspeed state of wind turbine 10 from at least the determined actual values of the first and second variables. In particular, according to certain embodiments, after determining actual values of a first and a second variable of wind turbine 10, controller 102 is programmed to evaluate these values for an estimation directed to identify an overspeed state of wind turbine 10. In the exemplary embodiment, controller 102 is programmed to evaluate at least one of the determined values of the rotor speed and of the rotor acceleration for identifying the occurrence of an overspeed state of wind turbine 10. As used herein, the term "identifying an overspeed state" is intended to be representative of a process for inferring the occurrence of a present overspeed state, or estimating the occurrence of an overspeed state within a predetermined period of time, or for identifying values of variables of the wind turbine which may lead to an overspeed condition to occur within a predetermined period of time.

According to certain embodiments, controller 102 is programmed to identify a future rotor speed based on determined actual values of a first and a second variable of wind turbine 10 and, typically, compare the identified future rotor speed with a predetermined rotor speed value for estimating an occurrence of an overspeed state.

In one embodiment, for evaluating the determined actual values of the first variable and the second variable in order to identify an overspeed state, controller 102 is programmed to continuously input the actual values of the first and second variables into a mathematical model that facilitates indentifying an overspeed state. According to at least some embodiments, controller 102 is programmed to identify a future rotor speed based on determined actual values of the first variable and the second variable. For example, in one embodiment, controller 102 is programmed to input an actual value of the rotor speed $v_i$ and an actual value of the rotor acceleration $a_i$ into the formula $v_i + a_i T$ for identifying a future rotor speed which will occur within a predetermined time period T. In one embodiment, the predetermined time period T ranges from about 0.1 to 5 seconds, or more specifically, 0.5 to 4 seconds, or, even more specifically, 1 to 3 seconds. In one embodiment, the predetermined time period T ranges from about 1 second to 3 seconds. Alternatively, the predetermined time period T may be any suitable period of time that enables controller 102 to identify a future rotor speed adequately. According to at least some of these embodiments, controller 102 is further programmed to compare the identified future rotor speed with a predetermined rotor speed value for identifying an overspeed state of wind turbine 10.

Typically, the value of the predetermined rotor speed corresponds to the maximum allowable speed of the wind turbine, which speed is predetermined by evaluating the specific characteristics of wind turbine 10. Typically, the maximum allowable speed is predetermined by taking into account the physical characteristics of the blade tips. In particular, the maximum allowable speed corresponds to a rotor speed at which the speed on an outer portion of rotor blade 22 (i.e., rim speed) does not exceed a speed between 70 to 110 m/s or, more specifically between 80 to 100 m/s, such as 90 m/s. In certain embodiments, the maximum allowable speed of wind turbine 10 is predetermined by taking into account the maximum allowable load on certain components of the wind turbine, such as rotor bearings, caused by rotation of rotor 18 or the maximum allowable load acting on tower 12 or nacelle 16. In certain embodiments, the maximum allowable speed is predetermined by taking into account the maximum allowable noise production of wind turbine 10. In certain embodiments, the maximum allowable speed may change depending on the particular conditions at which wind turbine 10 is subjected. For example, according to certain embodiments implemented in off-shore wind turbines, magnitude (i.e., force), or power density, and/or frequency of sea waves impacting on wind turbine 10 are taken into account for determining the maximum allowable speed at a particular time.

Alternatively, any suitable mathematical model may be used that enables wind controller 102 to identify an overspeed state as described herein. Such a suitable mathematical model may be a model having as inputs the acceleration in relation to gravity, referred to above, and its rate of change over time. Alternatively, such a suitable mathematical model may be a model having as additional inputs the wind speed and its rate of change over time. Typically, the mathematical model has as an input a combination of variables corresponding to a level of a certain magnitude of wind turbine 10 and its rate of change over time. According to certain embodiments, a mathematical model having more than two variables of wind turbine 10 as inputs is implemented in controller 102 for identifying a future value of the rotor speed. For example, such a mathematical model may have the second time derivative, the third time derivative, or even further time derivatives of the rotor speed as inputs for identifying a future value of the rotor value in an accurate manner. Typically, such a mathematical model is based on a finite Taylor series which provides an approximation of a future value of the rotor speed after a certain time. In another example, a mathematical model having the power output and the rotor acceleration as inputs is implemented in controller 102 for identifying a future value of the rotor speed.

According to certain embodiments, controller 102 is programmed to identify the time period for reaching a predetermined rotor speed value based on determined actual values of a first variable and a second variable of the wind turbine and, typically, compare the identified time period with a predetermined time period. In one embodiment, controller 102 is programmed to infer from the mathematical model the time period for reaching a predetermined rotor speed value based on the determined actual values of the first variable and the second variables and comparing the identified time period with a predetermined time period. For example, controller 102 may estimate the occurrence of an overspeed V by determining the time required for reaching the maximum allowable speed of wind turbine 10 by inputting an actual value of the rotor speed $v_i$ and an actual value of the rotor acceleration $a_i$ into the formula $(V-v_i)/a_i$. If the determined time period is below a predetermined time period, controller 102 identifies the occurrence of an overspeed state and correspondingly signals pitch drive system 68 for rotating rotor blades 22. Typically, the predetermined time period ranges from about 0.1 to 5 seconds, or more specifically, 0.5 to 4 seconds, or, even more specifically, 1 to 3 seconds.

According to certain embodiments, controller 102 is programmed to estimate an occurrence of an overspeed state of the wind turbine by activating a logic algorithm as soon as the value of a first variable indicative of an overspeed state of wind turbine 10 exceeds a predetermined value. For example, according to certain embodiments, the logic is activated when the rotor speed exceeds a value between 85%-95%, such as 90%, of the maximum allowable rotor speed. Alternatively, the logic is activated when a power output of wind turbine 10 exceeds a value between 85%-95%, such as 90%, of the maximum allowable power output. Alternatively, the logic is activated when a wind speed in the surroundings of wind turbine 10 exceeds a value between 8 m/s-12 m/s such as 10 m/s. Once the logic is activated, and as long as the first variable exceeds the predetermined value, controller 102 estimates an occurrence of an overspeed state by calculating a future value of the first variable, which value will occur within a predetermined period of time. Typically, the predetermined time period ranges from about 0.1 to 5 seconds, or more specifically, 0.5 to 4 seconds, or, even more specifically, 1 to 3 seconds.

According to certain embodiments, controller 102 is programmed to validate determined actual values of a first and a second variable of wind turbine 10 by comparing these values with a list of predetermined values for estimating the occurrence of an overspeed state of the wind turbine 10. In one embodiment, controller 102 may store a lookup table containing a list of predetermined values of the first and the second variable of wind turbine 10 for identifying which combination of these values lead to an overspeed state within a certain period of time. In particular, controller 102 may store a lookup table containing predetermined values of the rotor speed and of the rotor acceleration. By validating actual values of the rotor speed and the rotor acceleration in the lookup table, controller 102 may estimate an occurrence of an overspeed state of wind turbine 10. In particular, the lookup table may indicate to controller 102, by certain combinations of the actual values, to signal pitch drive system 68 for pitching rotor blades 22 in order to aerodynamically brake rotor 18.

A lookup table as referred to above is typically predetermined taking into account a suitable modelling of the wind turbine dynamics and maximum allowable parameters of wind turbine 10, such as, but not limited to, loads acting on certain components, such as tower 12, nacelle 16, or bearings in wind turbine 10, and noise production. Alternatively, the table is predetermined by any suitable method that enables wind controller 102 to estimate an occurrence of an overspeed state as described herein. In alternative embodiments, evaluation is performed based on a table correlating values of other variables, such as the power output and the rotor acceleration, or the rotor speed and the rate of change over time of the power output. According to certain embodiments, the lookup table has as input three or more variables of the wind turbine, or other parameters associated thereto, such as, but not limited to, a wind speed. According to certain embodiments, a lookup table and a mathematical model having as input at least one variable of wind turbine 10 are implemented in controller 102 for estimating an occurrence of an overspeed state.

According to certain embodiments, controller 102 further bases the estimation on a determined actual value of the wind speed for identifying an overspeed state of the wind turbine 10. For example, controller 102 may input actual values of the rotor speed, the rotor acceleration and the wind speed into a suitable mathematical model for identifying an overspeed of the wind turbine. In this manner, it is facilitated that controller 102 estimates the occurrence of an overspeed state in an accurate and reliable manner. In another example regarding an off-shore wind turbine, magnitude (i.e., force), or power density, and/or frequency of sea waves impacting on wind turbine 10 are taken into account for estimating an occurrence of an overspeed of wind turbine 10.

According to certain embodiments, controller 102 identifies an overspeed state based on at least one of a bending of a rotor blade 22, a power output of wind turbine 10, and/or a rotational speed of wind turbine 10 directly proportional to a rotational speed of the rotor. According to certain embodiments, controller 102 further bases the evaluation on the rate of change of at least one of these variables.

In the exemplary embodiment, controller 102 is further programmed to control at least one pitch drive system 68 when controller 102 positively estimates the occurrence of an overspeed state in order to aerodynamically brake rotor 18. In one embodiment, controller 102 is programmed to identify a future rotor speed based on the determined actual values of the first variable and the second variable, compare the identified future rotor speed with a predetermined rotor speed value for identifying an overspeed state of wind turbine 10, and to control pitch drive system 68 when an identified future rotor speed is at or exceeds the predetermined rotor speed value. In one embodiment, controller 102 is configured to control pitch drive system 68 in response to an identified occurrence of a future overspeed state in order to move rotor blade 22 to a feathered position so that rotation of rotor 18 is decelerated.

According to certain embodiments, pitch drive system 68 pitches rotor blade 22 at a pitch rate, the pitch rate being determined at least on the basis of at least one determined actual value of the first variable, and/or the second variable. In the exemplary embodiment, controller 102 determines a pitch rate for controlling at least one pitch drive system 68. Controller 102 may determine the pitch rate on the basis of determined actual values of the rotor speed and the rotor acceleration. Typically, by taking into account the actual values of both variables, blades 22 are pitched at a lower pitch rate as compared to a situation in which only the actual rotor speed is taken into account. Therefore, these embodiments facilitate smooth pitching of a rotor blade 22 in response to a condition of wind turbine 10 which may lead or leads to an overspeed state. The higher the pitch rate, the higher the number of excited resonant frequencies of wind turbine 10 is. Therefore, these embodiments facilitate that only a low number of resonant frequencies are excited during pitching and, consequently, tower vibration caused by pitching are typically kept low.

According to certain embodiments, controller 102 determines the pitch rate by taking into account a predetermined maximum rotor braking rate. Typically, pitch drive system 68 rotates rotor blade 22 in a manner such that the braking of rotor 18 does not exceed the predetermined maximum rotor braking rate. In one embodiment, the pitch rate is determined by taking into account a predetermined maximum load, such as, but not limited to, a maximum predetermined load of rotor bearings, tower 12, or nacelle 16. Typically, in this embodiment, pitch drive system 68 rotates rotor blades 22 in a manner such that a load acting on wind turbine 10 does not exceed the predetermined maximum load. For example, controller 102 may determine actual values of the load acting on certain components of wind turbine 10, such as, but not limited to, a load on rotor bearings, tower 12, or nacelle 16, and determine a pitch rate which effects aerodynamically braking of rotor 18 in a manner such that the load does not exceed the predetermined maximum load. In certain embodiments, pitch drive system 68 rotates rotor blades 22 in a manner such that a first variable of wind turbine 10, such as rotor speed, does not exceed a threshold value, such as the maximum allowable rotor speed referred to above.

Figure 5:
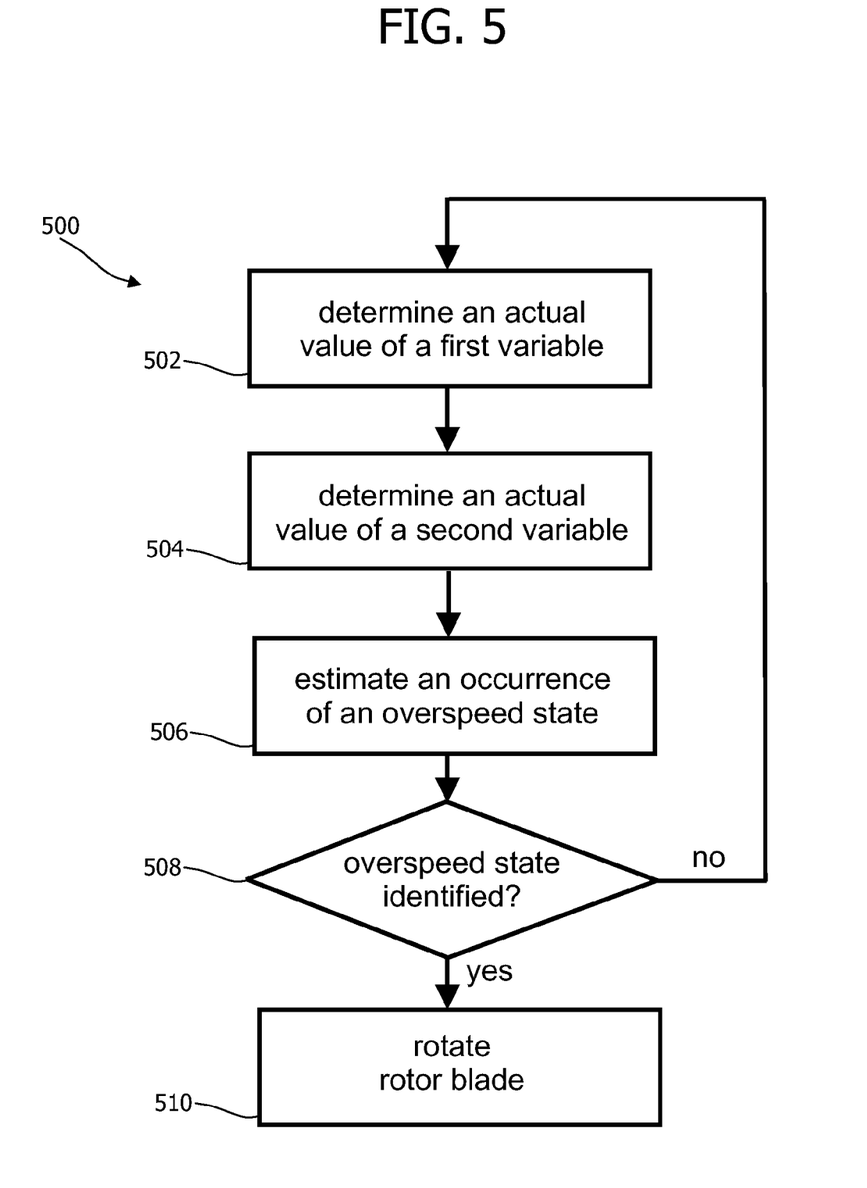
FIG. 5 is a flow chart illustrating an exemplary method for operating the wind turbine in FIG. 1.

FIG. 5 is a flow chart illustrating an exemplary method 500 for operating wind turbine 10 in FIG. 1. In the exemplary embodiment, method 500 includes determining 502 an actual value of a first variable indicative of an overspeed state of wind turbine 10. Typically, the first variable is monotonically correlated with a rotational speed of the rotor 18. For example, the first variable corresponds to the rotor speed, the bending of the rotor blade 22, a power output of wind turbine 10, or a rotational speed of the wind turbine 10, which rotational speed is directly proportional to a rotational speed of the rotor, such as the speed of high speed shaft 48, or the speed of electric generator 42. Alternatively, the first variable may correspond to the acceleration in relation to gravity referred to above. Exemplary method 500 further includes determining an actual value of a second variable of wind turbine 10 correlated to the rate of change over time of the first variable. Typically, the second variable is monotonically correlated with a rotational acceleration of the rotor 18.

Exemplary method 500 further includes estimating 506 an occurrence of an overspeed state of wind turbine 10 from at least the determined actual values of the first and second variables. According to some embodiments, estimation 506 includes identifying a future rotor speed based on the determined actual values of the first variable and the second variable and, optionally, comparing the identified future rotor speed with a predetermined rotor speed value for identifying an overspeed state of wind turbine 10. According to some embodiments, estimation 506 includes identifying the time period for reaching a predetermined rotor speed value based on the determined actual values of the first variable and the second variables and comparing the identified time period with a predetermined time period. According to certain embodiments, estimation 506 includes validating the determined actual values of the first and the second variables by comparing these values with a list of predetermined values. Thereby, the estimation of an occurrence of an overspeed state is facilitated.

Exemplary method 500 further includes pitching 510 rotor blades 22 for aerodynamically braking rotor 18 based on a result 508 of the estimation. Typically, rotor blades 22 are rotated when the result 508 of the estimation is the occurrence of an overspeed state within a predetermined time. According to certain embodiments, when an overspeed state is identified, pitch drive system 68 rotates rotor blade 22. In particular, it is typical that pitch drive system 68 pitches rotor blade 22 as soon as the occurrence of an overspeed state is identified in the estimation or with a delay corresponding to a predetermined time.

Figure 6:
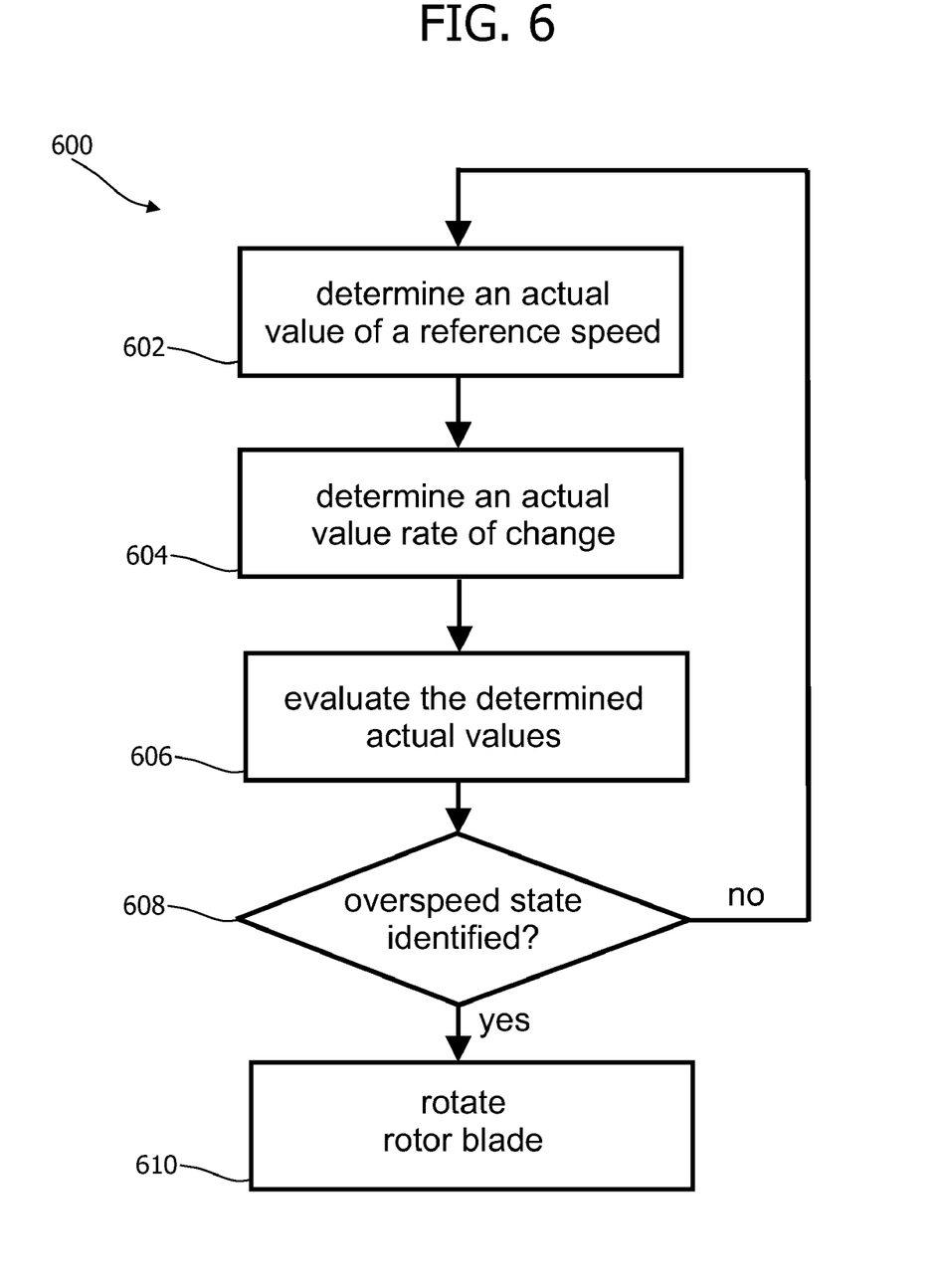
FIG. 6 is a flow chart illustrating another exemplary method for operating the wind turbine in FIG. 1; and, FIG. 7 is a schematic graphical representation of the response to an identified overspeed state of the wind turbine in FIG. 1 compared to the response of at least some known wind turbines.

FIG. 6 is a flow chart illustrating another exemplary method 600 for operating the wind turbine in FIG. 1. In the exemplary embodiment, method 600 includes determining 602 an actual value of a reference speed directly proportional to the rotational speed of the rotor. Typically, the reference speed corresponds to the rotor speed, the rotational speed of high speed shaft 48, or the speed of a rotatable part of wind turbine 10 coupled to rotor 18. Typically, the reference speed is indicative of an overspeed state of wind turbine 10 when it exceeds a threshold value. Typically, the threshold speed corresponds to the maximal allowable speed of the reference speed. Exemplary method 600 further includes determining 604 an actual value of a rate of change over time of the reference speed. Typically, this rate of change corresponds to the acceleration of rotor 18. Exemplary method 600 further includes evaluating 606 the determined actual values of the reference speed and the rate of change over time of the reference speed for identifying an overspeed state of the wind turbine. Exemplary method 600 further includes identifying 608 an overspeed state based on the result of the evaluation 606. When an overspeed state is identified, pitch drive system 68 rotates the rotor blade 22 in step 610.

Figure 7:
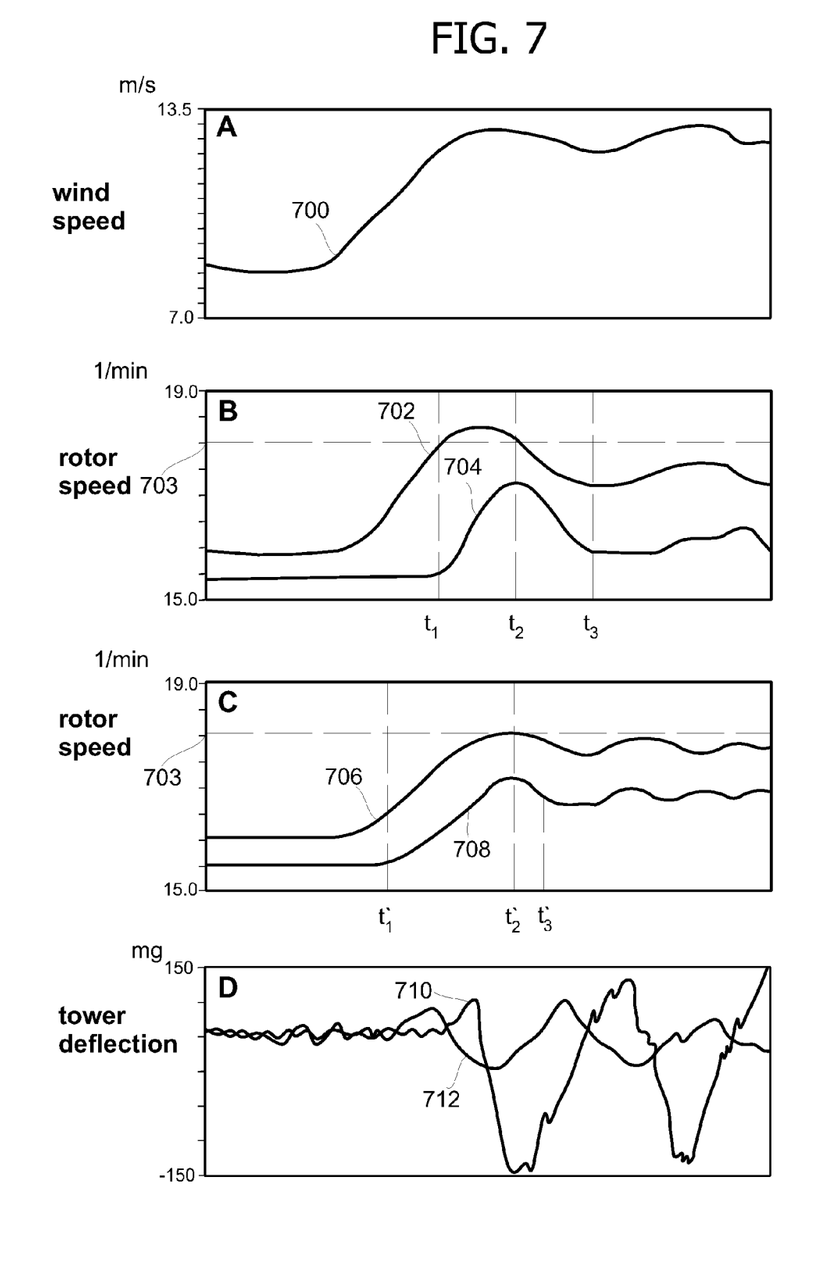

FIG. 7 is a schematic graphical representation of the response to an identified overspeed state of the wind turbine in FIG. 1 compared to the response to an overspeed of a known wind turbine caused by an increase of wind speed. In particular, the graphs show the response of the wind turbines during a time period of approximately 13 seconds (i.e., corresponding to the horizontal axis of the graphs). Graph A shows a time series graph of a wind speed 700 that typically leads to an increase of a rotor speed. The wind speed is shown in Graph A in meter per second units (m/s). The increase of rotor speed caused by wind speed 700 is shown in Graph B for at least one known wind turbine (line 702), and in Graph C for a wind turbine according to the exemplary embodiment above (line 706). The rotor speed is shown in both graphs in revolution per minute units (1/m). In the known wind turbine, rotor speed 702 exceeds at time t1 a predetermined rotor speed value 703 corresponding to a rotor overspeed. In the known wind turbine, the blade angle (line 704) is varied for decreasing the rotor speed as soon as rotor speed 702 exceeds predetermined value 703, that is, at time t1.

As shown in Graph C of FIG. 7, a blade angle (line 708) is varied in the exemplary embodiment for decreasing the rotor speed when the controller of the wind turbine identifies an overspeed state based on the above referred to estimation. In particular, the exemplary wind turbine estimates at time t1', a time instant prior to t1, the occurrence, within a certain time, of a future overspeed state of the wind turbine based on actual values of rotor speed and rotor acceleration. In the exemplary embodiment, pitch drive system 68 rotates rotor blades 22 at time t1'. That is, in the exemplary embodiment, the wind turbine starts pitching before rotor speed 706 would reach predetermined value 703 corresponding to a rotor overspeed. Consequently, controller 102 in the exemplary embodiment identifies the occurrence of a future overspeed state and reacts before the wind turbine enters the estimated overspeed state. Thereby, the exemplary wind turbine is able to perform a smoother pitch than the known wind turbine in order to decrease the rotor speed in response to an increase of wind speed capable of causing an overspeed state of the wind turbine. Thereby, the pitching of the exemplary wind turbine causes a smoother braking of the rotor as compared to the known wind turbine and, consequently, reduces the transient loads acting on wind turbine components.

Generally, pitching of blades in a wind turbine for decreasing the rotor speed implies that the wind turbine in pulled against the wind (i.e., it results in a wind tower deflection towards the wind). This pulling typically increases with the pitch rate. Graph D shows a tower deflection 710 in response to the variation of blade angle 704 of the known wind turbine in Graph B, and a tower deflection 712 in response to the variation of blade angle 708 of the exemplary embodiment in Graph C. The known wind turbine is pulled against the wind during time t1 and time t2 while the wind turbine in the exemplary embodiment is pulled against the wind during time t1' and time t2'. Since pitching is performed at a lower pitch rate for the wind turbine in the exemplary embodiment, the corresponding deflection of the wind tower is lower than for the known wind turbine. At time t2, rotor speed 702 of the known wind turbine is decreased back below predetermined value 703 and blade angle 704 is varied in the contrary direction for maintaining the rotor speed as high as possible. Consequently, the wind tower in the known wind turbine is pushed with respect the wind, as shown by tower deflection 710, between time t2 and time t3.

This pull and push in the known wind turbine excites the resonant frequency of the tower, as shown by tower deflection 710 in Graph D. The tower vibration is shown in Graph D in milligravity units (1 g=9.81 m/s$^2$). Generally, such a resonant vibration of the known wind turbine requires shutting down the wind turbine. In contrast thereto, due to the lower pitch rate in the exemplary wind turbine, the corresponding tower deflection 712 is lower than in the known wind turbine. In this example, tower deflection 712 does not lead to a resonant vibration of the tower. Consequently, in this example, pitching of the exemplary wind turbine when an overspeed state is identified does not require a shutdown thereof. Furthermore, loads acting on the exemplary wind turbine during pitching are significantly reduced in comparison to the known wind turbine.

Exemplary embodiments of systems and methods for operating a wind turbine are described above in detail. The systems and methods are not limited to the specific embodiments described herein, but rather, components of the systems and/or steps of the methods may be utilized independently and separately from other components and/or steps described herein. For example, the method may evaluate values of a variable determined through a sensor and values of another variable determined using a suitable mathematical model having as input the first variable and other dynamic variables, such as wind speed, and are not limited to practice with only the wind turbine systems as described herein. Rather, the exemplary embodiment can be implemented and utilized in connection with many other rotor blade applications.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, the wind turbine comprising a rotor including at least one rotor blade and a pitch drive system coupled to the at least one rotor blade, the pitch drive system being configured to pitch the at least one rotor blade, said method comprising:
   determining an actual value of a first variable indicative of an overspeed state of the wind turbine;
   determining an actual value of a second variable of the wind turbine correlated to the rate of change over time of the first variable; and
   estimating an occurrence of an overspeed state of the wind turbine from at least the determined actual values of the first and second variables,
   wherein the pitch drive system pitches the at least one rotor blade for aerodynamically braking said rotor based on the result of said estimation.

2. The method according to claim 1, wherein the pitch drive system pitches the at least one rotor blade for aerodynamically braking said rotor when the result of said estimation is the occurrence of an overspeed state within a predetermined time.

3. The method according to claim 1, wherein said estimation comprises identifying a future rotor speed based on the determined actual values of the first and the second variables, and wherein the future rotor speed is between about 0.5 seconds and about 4 seconds in the future.

4. The method according to claim 3, wherein said estimation further comprises comparing the identified future rotor speed with a predetermined rotor speed value.

5. The method according to claim 1, wherein said estimation comprises identifying the time period for reaching a predetermined rotor speed value based on the determined actual values of the first and second variables and comparing the identified time period with a predetermined time period.

6. The method according to claim 1, wherein said estimation comprises validating the determined actual values of the first and the second variables by comparing said values with a list of predetermined values for estimating the occurrence of an overspeed state of the wind turbine.

7. The method according to claim 1, wherein the first variable corresponds to one of a bending of the at least one rotor blade, a power output of the wind turbine, or a rotational speed of the wind turbine, which rotational speed is directly proportional to a rotational speed of the rotor.

8. The method according to claim 1, further comprising determining a pitch rate for rotating the at least one rotor blade, wherein said pitch rate is determined at least on the basis of the determined actual values of the first variable or the second variable.

9. The method according to claim 8, wherein determining the pitch rate includes taking into account a predetermined maximum rotor braking rate, and the pitch drive system pitches the at least one rotor blade in a manner such that the braking of said rotor does not exceed said predetermined maximum rotor braking rate.

10. The method according to claim 8, wherein determining the pitch rate includes taking into account a predetermined maximum lead braking rate, and the pitch drive system pitches the at least one rotor blade in a manner such that a braking rate acting on the wind turbine does not exceed said predetermined maximum braking rate.

11. The method according to claim 1, wherein the pitch drive system pitches the at least one rotor blade in a manner such that the first variable does not exceed a threshold value.

12. The method according to claim 1, wherein determining the actual value of the second variable of the wind turbine includes calculating the rate of change over time of at least two actual values of the first variable.

13. The method according to claim 1, further comprising determining an actual value of a wind speed in an area close to the wind turbine, wherein said estimating is further based on the determined actual value of the wind speed for identifying an overspeed state of the wind turbine.

14. A control assembly for use with a wind turbine, the wind turbine including a rotor including at least one rotor blade, said control assembly comprising:
   a pitch drive system coupled to the at least one rotor blade, the pitch drive system being configured to pitch the at least one rotor blade; and
   a control system being communicatively coupled to said pitch drive system, said control system being configured to:
      determine an actual value of a first variable indicative of an overspeed state of the wind turbine;
      determine an actual value of a second variable of the wind turbine correlated to the rate of change over time of the first variable; and
      estimate an occurrence of an overspeed state of the wind turbine from at least the determined actual values of the first and second variables; and
   wherein the control system is configured to control the pitch drive system in a manner such that the control pitch drive system pitches the at least one rotor blade for aerodynamically braking said rotor based on the result of said estimation.

15. The control assembly according to claim 14, further comprising a sensor system communicatively coupled to said control system, said sensor system being configured to measure at least one of the actual value of the first variable or the actual value of the second variable.

16. The control assembly according to claim 15, wherein said sensor system is adapted for being coupled to a rotatable part of the wind turbine, said rotatable part being connected to the rotor for establishing at least one of the actual value of the first variable or the actual value of the second variable by measuring the rotational speed of said rotatable part.

17. The control assembly according to claim 15, wherein said sensor system is adapted for being coupled to an electric generator part of the wind turbine for establishing at least one of the actual value of the first variable or the actual value of the second variable by measuring a power output of said electric generator part.

18. The control assembly according to claim 15, wherein said sensor system is further configured to measure an actual value of a wind speed in an area close to the wind turbine, and said control system is configured to perform said estimation further based on the determined actual value of the wind speed.

19. The control assembly according to claim 15, wherein said wind turbine further comprises a tower, and wherein said sensor system is further configured to measure an actual value of a bending or vibration of the at least one rotor blade or the tower.

20. A method for operating a wind turbine, the wind turbine comprising a rotor including at least one rotor blade, and a pitch drive system coupled to the at least one rotor blade, the pitch drive system being configured to pitch the at least one rotor blade, said method comprising:

determining an actual value of a reference speed directly proportional to the rotational speed of the rotor;
determining an actual value of a rate of change over time of the reference speed; and
evaluating the determined actual values of the reference speed and the rate of change over time of the reference speed for identifying an overspeed state of the wind turbine;
wherein the pitch drive system rotates the at least one rotor blade when an overspeed state of the wind turbine is identified in said evaluation.

21. The method according to claim 1, wherein the estimation is based in part on a lookup table which correlates values of the first and second variables with the occurrence of the overspeed state.

22. The control assembly according to claim 14, wherein the estimation is based in part on a lookup table which correlates values of the first and second variables with the occurrence of the overspeed state.

* * * * *

UNITED STATES PATENT AND TRADEMARK OFFICE
CERTIFICATE OF CORRECTION

| | | |
|---|---|---|
| PATENT NO. | : 8,210,811 B2 | Page 1 of 1 |
| APPLICATION NO. | : 12/856767 | |
| DATED | : July 3, 2012 | |
| INVENTOR(S) | : Friedrich Loh et al. | |

It is certified that error appears in the above-identified patent and that said Letters Patent is hereby corrected as shown below:

In Column 19, Line 64, in Claim 10, delete "maximum lead" and insert -- maximum --, therefor.

Signed and Sealed this
Ninth Day of October, 2012

David J. Kappos
*Director of the United States Patent and Trademark Office*